2,787,634

INHIBITION OF AUTOPOLYMERIZATION IN VINYL-TYPE COMPOUNDS

Harry W. Coover, Jr., and Newton H. Shearer, Jr., Kingsport, Tenn., assignors to Eastman Kodak Company, Rochester, N. Y., a corporation of New Jersey No Drawing. Application August 19, 1953,
Serial No. 375,280

6 Claims. (Cl. 260—465.9)

The present invention relates to the inhibition of autopolymerization of vinyl-type substances by the use of relatively small, stabilizing amounts of a novel inhibitor. By "inhibitor," we mean a substance which functions to prevent or retard polymer formation during storage, transportation, purification and the like. By "vinyl-type compounds," we mean, in a general sense, olefinic compounds susceptible to autopolymerization through the action of the olefinic linkage thereof. Thus, "vinyl-type compounds" within the present terminology include the more specific classes of compounds such as vinyl monomers, acrylic monomers, vinylidene monomers, methacrylic monomers and monomeric styrenes.

The terms "acrylic monomers" and "methacrylic monomers" as used herein are intended to cover, but are not limited to, such compounds as acrylonitrile, methacrylonitrile, methylmethacrylate, methylacrylate, methacrylamide, etc. The term "monomeric styrene" is inclusive of, but not limited to, styrene and derivatives thereof such as α-methyl styrene and derivatives having substituents in the aromatic ring. The term "vinyl compounds" (as distinguished from the more generic "vinyl-type compounds") is inclusive of but not limited to compounds such as vinyl chloride, vinyl acetate, etc.

Under the above species we mean to include not only pure monomers but also partial (low molecular weight) polymers which are intermediate compounds between pure monomers and the high molecular weight polymers.

As is well known, vinyl-type monomers are quite generally subject to autopolymerization in storage and particularly under the influence of air, heat and light. It has been known for some time that certain aromatic nitro compounds exhibit varying degrees of efficiency as inhibiting agents for vinyl-type monomers in the autopolymerization of the latter. However, it has been taught by prior investigation that the effectiveness of an aromatic nitro compound as a polymerization inhibitor is directly related to the number of nitro groups substituted in the aromatic ring. For example, U. S. Patent No. 1,550,323, Ostromislensky and Shepard contains the statement that nitrobenzene and dinitrobenzene are not as effective in the inhibition of polymerization of styrene as is trinitrobenzene. Price and Durham, J. A. C. S., 65, 757 (1943), have reported that in the study of polymerization of styrene in the presence of nitro aromatic compounds, an increase in the number of nitro groups increases the retarding influence of the stabilizing substances, presumably due to the effect of the nitro groups in increasing the activation of the aromatic nucleus.

We have now discovered, contrary to prior expectations, that a particular aromatic mononitro compound is an excellent inhibitor of autopolymerization of vinyl-type compounds. Furthermore, contrary to prior observations that substituted nitro aromatic compounds are less effective than unsubstituted, we have discovered that a particular polyhydroxy nitro aromatic compound provides excellent inhibition for vinyl-type compounds.

In accordance with our invention, autopolymerization of a vinyl-type compound is very effectively inhibited by means of the formation of a mixture of the vinyl-type compound with nitrohydroquinone in an amount of about 0.01% to 2.0%, preferably about 0.1% by weight of the vinyl-type compound. Thus, it is an object of the invention to provide stable compositions of matter comprising olefinic material normally susceptible to autopolymerization and selected from the group consisting of vinyl monomers, acrylic monomers, vinylidene monomers, methacrylic monomers and monomeric styrenes and as an inhibitor a relatively small amount of nitrohydroquinone. A further object of the invention is to provided stabilized compositions of vinyl-type monomers which may be subjected to relatively high temperatures, such as those developed during fractional distillation, and which may be stored and shipped in contact with air, light, and heat for relatively long periods of time without undergoing destructive autopolymerization.

The inhibitors and compositions thereof in accordance with the present invention are particularly useful for the reason that the inhibited compositions acquire no undesirable odor by reason of the inhibitor. They likewise acquire very little color, and the inhibitor is particularly advantageous in that it is effective at very low concentrations. A further advantage of nitrohydroquinone is that it does not constitute the explosion hazard which is present when inhibitors such as trinitrobenzene and picric acid are employed. Still another advantage is that nitrohydroquinone is less volatile and less subject to being carried over during distillation than certain other inhibitors such as hydroquinone.

The invention is illustrated in the following examples which are representative of its more advantageous embodiments.

*Example 1*

Approximately 0.1% by weight of nitrohydroquinone was added to a sample of methacrylonitrile and the resulting mixture was subjected to distillation. There was no noticeable formation of polymer in the apparatus during the distillation. At the conclusion of the distillation after some 25 hours, analysis showed only 0.1% polymer formed.

*Example 2*

Sealed vials of methylmethacrylate, methylacrylate, and acrylonitrile containing about 0.1% nitrohydroquinone were exposed to direct sunlight for two weeks. No evidence of polymerization was seen at the end of this time. Unstabilized samples under the same conditions began to polymerize after a few hours.

*Example 3*

A sealed vial of styrene containing approximately 0.1% nitrohydroquinone was heated at 100° C. for a period of 40 hours. At the end of this period less than 0.2% polymer was formed.

*Example 4*

For purpose of comparison, an inhibitor of the prior art was used following the procedure of Example 1. Approximately 0.1% by weight of trinitrobenzene was added to a sample of methacrylonitrile and the resulting mixture was subjected to distillation to free the methacrylonitrile of the inhibitor. At the conclusion of the distillation, after about 25 hours, analysis showed that about 1.0% polymer formation had occurred. The use of nitrohydroquinone under analogous conditions resulted in only 0.1% polymer formation.

We claim:

1. A composition of matter comprising an autopolymerization-susceptible compound having a terminal acyclic group $CH_2=C<$ and nitrohydroquinone admixed with said compound in an amount equivalent to about 0.01%–2.0% of the weight of the compound.

2. An autopolymerization-inhibited composition comprising methacrylonitrile and about 0.1% by weight of nitrohydroquinone admixed therewith.

3. An autopolymerization-inhibited composition comprising methylmethacrylate and about 0.1% by weight of nitrohydroquinone admixed therewith.

4. An autopolymerization-inhibited composition comprising methylacrylate and about 0.1% by weight of nitrohydroquinone admixed therewith.

5. An autopolymerization-inhibited compostion comprising acrylonitrile and about 0.1% by weight of nitrohydroquinone admixed therewith.

6. An autopolymerization-inhibited composition comprising styrene and about 0.1% by weight of nitrohydroquinone admixed therewith.

References Cited in the file of this patent

UNITED STATES PATENTS

| | | |
|---|---|---|
| 1,950,438 | Carothers et al. | Mar. 13, 1934 |
| 2,225,471 | Foord | Dec. 17, 1940 |
| 2,301,131 | Lichty | Nov. 3, 1942 |
| 2,481,080 | Castner et al. | Sept. 6, 1949 |
| 2,614,119 | Nichols | Oct. 14, 1952 |
| 2,678,945 | Taylor | May 18, 1954 |
| 2,704,770 | Anspon | Mar. 22, 1955 |